United States Patent
Jensen et al.

(10) Patent No.: US 10,422,585 B2
(45) Date of Patent: Sep. 24, 2019

(54) HEAT EXCHANGER WITH INTERSPERSED ARRANGEMENT OF CROSS-FLOW STRUCTURES

(71) Applicant: HONEYWELL INTERNATIONAL INC., Morris Plains, NJ (US)

(72) Inventors: Joseph Jensen, Torrance, CA (US); Jorge Alvarez, Buena Park, CA (US); Francis Carbonell, Carson, CA (US); Mark C. Morris, Phoenix, AZ (US); Donald G Godfrey, Phoenix, AZ (US); Karl Fleer, San Pedro, CA (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 15 days.

(21) Appl. No.: 15/712,615

(22) Filed: Sep. 22, 2017

(65) Prior Publication Data
US 2019/0093954 A1    Mar. 28, 2019

(51) Int. Cl.
*F28D 1/053*       (2006.01)
*F02C 7/10*         (2006.01)
(Continued)

(52) U.S. Cl.
CPC ............ *F28D 1/05383* (2013.01); *F02C 7/10* (2013.01); *F28D 7/163* (2013.01); *F28D 7/1615* (2013.01);
(Continued)

(58) Field of Classification Search
CPC .. F28D 1/05383; F28D 1/05391; F28D 7/163; F28D 7/1615; F28D 7/1623; F28D 7/1638; F28D 7/1646; F28D 9/0062; F28D 9/0068; F02C 7/10; F28F 1/022; F28F 1/34; F28F 9/26
(Continued)

(56) References Cited

U.S. PATENT DOCUMENTS 3,627,034 A * 12/1971 Howe .................... F04B 39/06
                                                                165/158
3,983,935 A    10/1976 Henrion
(Continued)

FOREIGN PATENT DOCUMENTS

| EP | 3244153 A1 | 11/2017 |
| GB | 1506721 A | 4/1978 |
| JP | WO2008136217 A1 | 7/2010 |

OTHER PUBLICATIONS

Extended EP Search Report for Application No. 18193318.5 dated Dec. 20, 2018.
(Continued)

*Primary Examiner* — Joel M Attey
(74) *Attorney, Agent, or Firm* — Lorenz & Kopf, LLP

(57) ABSTRACT

A heat exchanger includes a separator member that divides a first flow passage from a second flow passage. The heat exchanger also includes a plurality of first hollow members that extend across the first flow passage at respective non-orthogonal angles. The plurality of first hollow members are fluidly connected to the second flow passage. Moreover, the heat exchanger includes a plurality of second hollow members that extend across the second flow passage at respective non-orthogonal angles. The plurality of second hollow members are fluidly connected to the first flow passage.

13 Claims, 6 Drawing Sheets

(51) Int. Cl.
*F28D 21/00* (2006.01)
*F28D 7/16* (2006.01)
*F28F 1/02* (2006.01)
*F28F 9/26* (2006.01)
*F28D 9/00* (2006.01)
*F28F 1/34* (2006.01)

(52) U.S. Cl.
CPC ......... *F28D 9/0062* (2013.01); *F28D 21/001* (2013.01); *F28F 1/022* (2013.01); *F28F 1/34* (2013.01); *F28F 9/26* (2013.01); *F05D 2260/213* (2013.01); *F28D 1/05391* (2013.01); *F28D 7/1623* (2013.01); *F28D 7/1638* (2013.01); *F28D 7/1646* (2013.01); *F28D 9/0068* (2013.01); *F28D 2021/0021* (2013.01); *F28D 2021/0026* (2013.01); *F28F 2215/06* (2013.01); *F28F 2255/14* (2013.01); *F28F 2255/18* (2013.01)

(58) Field of Classification Search
USPC ..................................... 165/109.1, 164, 166
See application file for complete search history.

(56) References Cited

U.S. PATENT DOCUMENTS

| | | |
|---|---|---|
| 5,845,399 A | 12/1998 | Dewar et al. |
| 7,926,261 B2 | 4/2011 | Porte |
| 9,777,973 B2* | 10/2017 | Heusser ................ B01F 5/0619 |
| 2008/0277095 A1 | 11/2008 | Zhai |
| 2013/0236299 A1 | 9/2013 | Kington et al. |
| 2015/0027669 A1 | 1/2015 | Kokas et al. |
| 2016/0202003 A1 | 7/2016 | Gerstler et al. |

OTHER PUBLICATIONS

European Patent Office, Examination Report for Application No. 18193318.5, dated May 16, 2019.

* cited by examiner

HEAT EXCHANGER WITH INTERSPERSED ARRANGEMENT OF CROSS-FLOW STRUCTURES

TECHNICAL FIELD

The present disclosure generally relates to a heat exchanger and, more particularly, relates to a heat exchanger with an interspersed arrangement of cross-flow structures.

BACKGROUND

Heat exchangers have been developed for various devices, such as engine systems, computer systems, HVAC systems, and more. The heat exchangers are configured for directing heat within the device to components where such heat is beneficial to its operating performance, for directing heat away from components that normally cannot tolerate high temperatures, and/or where system operational constraints require controlled temperatures.

For example, gas turbine engines may include various heat exchangers. In one example, a class of heat exchangers known as recuperators have been developed to recover heat from the engine exhaust, which is otherwise wasted energy, and redirect the recovered engine exhaust heat to the pre-combustion portion of the engine, to increase its overall engine efficiency. Specifically, the recuperator is a heat exchanger that transfers some of the waste heat in the exhaust to the compressed air before it enters the combustion portion of the engine, thereby preheating it before entering the fuel combustor stage. Since the compressed air has been pre-heated, less fuel is needed to heat the compressed air/fuel mixture up to the desired turbine inlet temperature. By recovering some of the energy usually lost as waste heat, the recuperator can make a gas turbine engine significantly more efficient.

In another example, cooling air may be provided to various turbine engine components using cooling air extracted from other parts of the engine. More specifically, in some gas turbine engines, cooling air is extracted from the discharge of the compressor, and is then directed to certain portions of the turbine. During some operating conditions, the air that is extracted from the engine for cooling may be at temperatures that require the air to be cooled before being directed to the particular component requiring cooling. To achieve the required cooling, cooling air may be directed through one or more heat exchangers within the engine.

Conventional heat exchangers may be too heavy, bulky, and/or may not provide acceptable performance characteristics. Other heat exchangers may be too expensive and/or difficult to manufacture. Moreover, some heat exchangers may be susceptible to thermo- mechanical fatigue, which reduces their service life and/or necessitates costly repairs or replacement.

Hence, there is a need for improved heat exchangers for use in gas turbine engines and other applications having improved efficiency, reduced manufacturing costs, and increased operating lifespan. The present disclosure addresses at least these needs.

BRIEF SUMMARY

In one embodiment, a heat exchanger is disclosed that includes a separator member that divides a first flow passage of the heat exchanger from a second flow passage of the heat exchanger. The heat exchanger also includes a plurality of first hollow members that extend across the first flow passage and that are attached to the separator member at respective non-orthogonal angles. The plurality of first hollow members being fluidly connected to the second flow passage. Moreover, the heat exchanger includes a plurality of second hollow members that extend across the second flow passage and that are attached to the separator member at respective non-orthogonal angles. The plurality of second hollow members are fluidly connected to the first flow passage. The first flow passage is configured to receive a first fluid that flows through the first flow passage and into the plurality of second hollow members. The second flow passage is configured to receive a second fluid that flows through the second flow passage and into the plurality of first hollow members. The first fluid is configured to exchange heat with the second fluid as the first fluid flows through the first flow passage and over the plurality of first hollow members. The second fluid is configured to exchange heat with the first fluid as the second fluid flows through the second flow passage and over the plurality of second hollow members.

In another embodiment, a heat exchanger is disclosed that includes a first separator member and a second separator member. The first separator member divides an intermediate flow passage of the heat exchanger from an upper flow passage of the heat exchanger. The second separator member divides the intermediate flow passage from a lower flow passage of the heat exchanger. The upper flow passage has a first inlet and a first outlet and is configured to direct flow of a first fluid along a first flow axis from the first inlet to the first outlet. The intermediate flow passage has a second inlet and a second outlet and is configured to direct flow of a second fluid along a second flow axis from the second inlet to the second outlet. The heat exchanger further includes a hollow member that extends across the intermediate flow passage and that is attached to the first separator member and the second separator member. The hollow member is fluidly connected to the upper flow passage and the lower flow passage. The hollow member is oriented with respect to the first flow axis to direct flow of the first fluid through the at least one hollow member along the first flow axis.

Moreover, a method of manufacturing a heat exchanger is disclosed that includes forming a first flow structure with a first flow passage and a second flow structure with a second flow passage. This includes forming a separator member that divides the first flow passage from the second flow passage. The method also includes forming a plurality of first hollow members that extend across the first flow passage and that are attached to the separator member at respective non-orthogonal angles. The plurality of first hollow members are fluidly connected to the second flow passage. The method additionally includes forming a plurality of second hollow members that extend across the second flow passage and that are attached to the separator member at respective non-orthogonal angles. The plurality of second hollow members are fluidly connected to the first flow passage. The first flow passage is configured to receive a first fluid that flows through the first flow passage and into the plurality of second hollow members. The second flow passage is configured to receive a second fluid that flows through the second flow passage and into the plurality of first hollow members. The first fluid is configured to exchange heat with the second fluid as the first fluid flows through the first flow passage and over the plurality of first hollow members. The second fluid is configured to exchange heat with the first fluid as the second fluid flows through the second flow passage and over the plurality of second hollow members.

BRIEF DESCRIPTION OF THE DRAWINGS

The present disclosure will hereinafter be described in conjunction with the following drawing figures, wherein like numerals denote like elements, and wherein.

DETAILED DESCRIPTION

Figure 1:
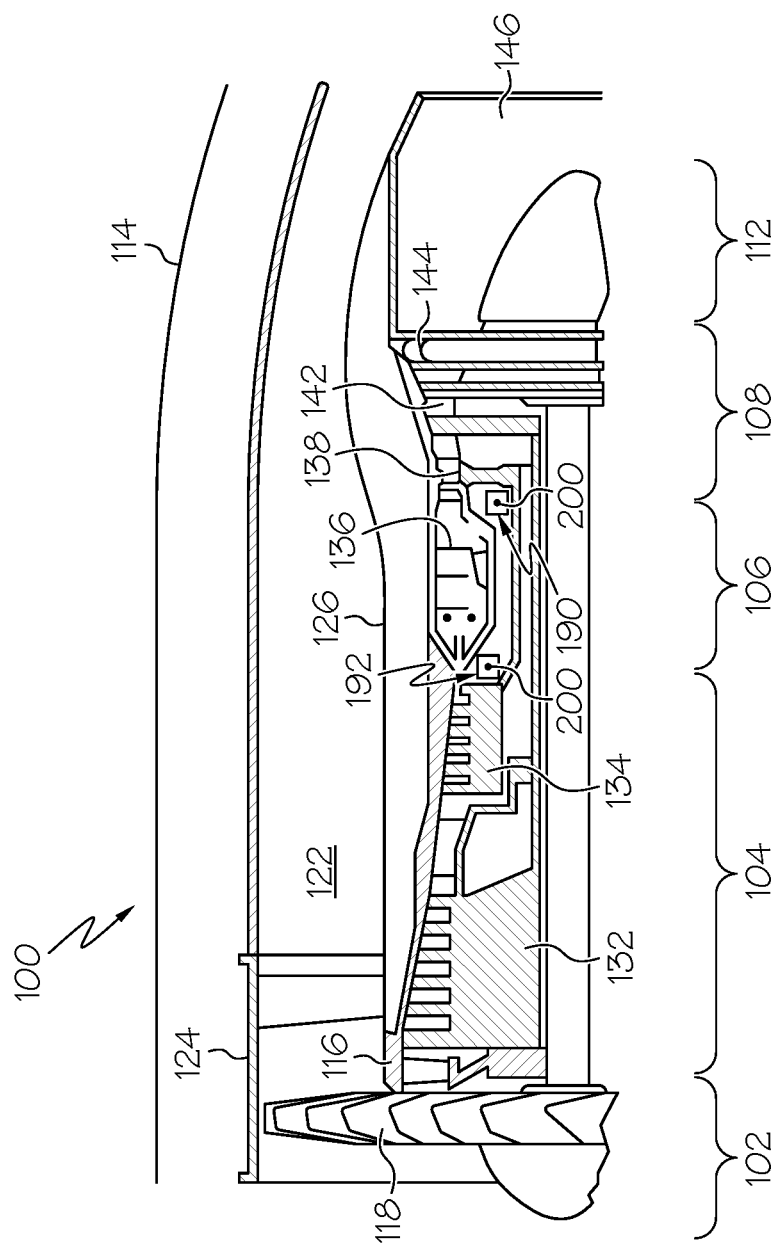
FIG. 1 is a schematic side view of a gas turbine engine with a heat exchanger according to exemplary embodiments of the present disclosure.

The following detailed description is merely exemplary in nature and is not intended to limit the present disclosure or the application and uses of the present disclosure. As used herein, the word "exemplary" means "serving as an example, instance, or illustration." Thus, any embodiment described herein as "exemplary" is not necessarily to be construed as preferred or advantageous over other embodiments. Furthermore, as used herein, numerical ordinals such as "first," "second," "third," etc. simply denote different singles of a plurality unless specifically defined by language in the appended claims. All of the embodiments and implementations of the heat exchange systems described herein are exemplary embodiments provided to enable persons skilled in the art to make or use the invention and not to limit the scope of the present disclosure, which is defined by the claims. Furthermore, there is no intention to be bound by any expressed or implied theory presented in the preceding technical field, background, brief summary, or the following detailed description.

The present disclosure relates to a heat exchanger, which may be suitable for use in gas turbine engines and other applications. The heat exchanger may provide improved heat transfer performance, increased manufacturability, and/ or improved operational lifespan. In one implementation, the heat exchanger is embodied as a recuperator or other similar component for heating a fluid (e.g., air) prior entry into another component (e.g., a combustor). In another implementation, the heat exchanger is embodied as a cooling air heat exchanger for reducing the temperature of cooling fluid (e.g., air) prior to its delivery to another component that requires cooling (e.g., a turbine component or cooling system). However, it will be appreciated that the presently disclosed heat exchanger is not limited to use in the aforementioned embodiments. Rather, it is expected that the heat exchanger disclosed herein will be suitable for use in a wide array of applications. Some non-limiting examples include engine oil and/or fuel cooling, auxiliary power units, environmental control systems, chemical reaction systems, and any other systems where heat transfer/exchange between two fluid media is either required or desirable.

In general, the heat exchanger may include a plurality of structures that define first flow passages and second flow passage that are disposed in an alternating arrangement. The heat exchanger may also include a plurality of first hollow members (e.g., tubes, conduits, etc.) that extend across a respective first flow passage and that are fluidly connected to opposing second flow passages. Moreover, the heat exchanger may include a plurality of second hollow members (e.g., tubes, conduits, etc.) that extend across a respective second flow passage and that are fluidly connected to opposing first flow passages. Accordingly, a first fluid may flow along a first flow axis through one of the first flow passages, and the first fluid may flow via the second hollow members to another first flow passage. Likewise, a second fluid may flow along a second flow axis through one of the second flow passages, and the second fluid may flow via the first hollow members to another second flow passage. The first fluid and the second fluid may exchange heat during such flow.

At least one of the first hollow members may extend along an axis that is disposed at a non-orthogonal angle relative to the second flow axis of the second flow passage. Accordingly, a pressure differential may exist along the first hollow member to draw the second fluid therethrough. Likewise, at least one of the second hollow members may extend along an axis that is disposed at a non-orthogonal angle relative to the first flow axis. Accordingly, a pressure differential may exist along the second hollow member to draw the first fluid therethrough. As such, the heat exchanger may be highly efficient, lightweight, and may have a relatively long operating life.

Referring now particularly to FIG. 1, a simplified cross section view of an exemplary gas turbine engine 100 is depicted. The depicted engine 100 includes an intake section 102, a compressor section 104, a combustion section 106, a turbine section 108, and an exhaust section 112. The intake section 102, compressor section 104, combustion section 106, turbine section 108, and exhaust section 112 are all mounted within a nacelle 114. The compressor section 104, combustion section 106, and turbine section 108 are all mounted within an engine case 116.

The intake section 102 includes a fan 118, which draws air into the engine 100 and accelerates it. A fraction of the accelerated fan air that is exhausted from the fan 118 is directed through a fan air bypass duct 122, which is defined by an outer fan duct 124, and which is spaced apart from and surrounds an inner fan duct 126. Most of the fan air that flows through the fan air bypass duct 122 is discharged from the bypass duct 122 to generate a forward thrust. The fraction of fan air that does not flow into the fan air bypass duct 122 is directed into the compressor section 104.

The compressor section 104 can include one or more compressors. The engine 100 depicted in FIG. 1 includes two compressors: an intermediate pressure compressor 132 and a high pressure compressor 134. No matter the number of compressors it includes, the air that is directed into the compressor section 104 is pressurized to a relatively high pressure. The relatively high pressure air that is discharged from the compressor section 104 is directed into the combustion section 106.

The combustion section 106 includes a combustor 136 that is coupled to receive both the relatively high pressure air and atomized fuel. The relatively high pressure air and atomized fuel are mixed within the combustor 136 and the mixture is ignited to generate combusted air. The combusted air is then directed into the turbine section 108.

The depicted turbine section 108 includes three turbines: a high pressure turbine 138, an intermediate pressure turbine 142, and a low pressure turbine 144, though it should be appreciated that any number of turbines may be included. The combusted air directed into the turbine section 108 expands through each of turbines 138, 142, 144, causing each to rotate. The air is then exhausted through a propulsion nozzle 146 disposed in the exhaust section 112 to provide additional forward thrust. As the turbines 138, 142, 144 rotate, each drives equipment in the gas turbine engine 100 via concentrically disposed shafts or spools as best seen in FIG. 1.

The engine 100 may further include at least one heat exchanger 200 (shown schematically). In some embodiments, the heat exchanger 200 may be included in a cooling air system 190 for providing cooling air to cool various portions and/or components within the engine 100. For example, the heat exchanger 200 of the cooling air system 190 may extract cooling air from the discharge of the compressor section 104 and direct the cooling air to the turbine section 108. Additionally, or in the alternative, the heat exchanger 200 may be included in a recuperator 192 for providing heated air to various portions and/or components within the engine 100. For example, the recuperator 192 may recover hot engine exhaust gas from the combustor 136 and the heat exchanger 200 therein may transfer heat from the exhaust gas to the air flowing into the combustor 136.

Figure 2:
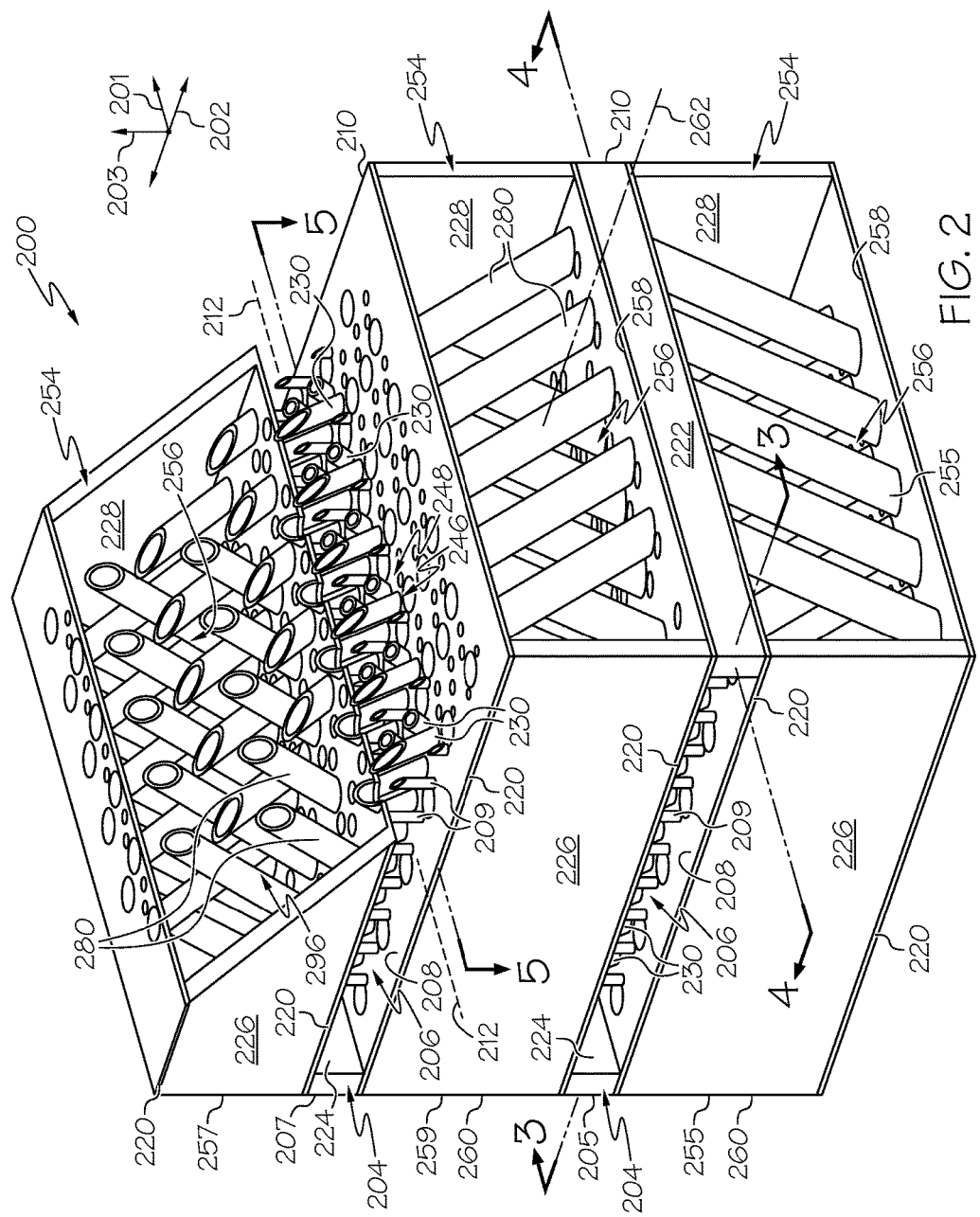
FIG. 2 is a perspective view of a heat exchanger according to example embodiments of the present disclosure, wherein the heat exchanger may be configured for use within the gas turbine engine of FIG. 1.

With reference to FIG. 2, the heat exchanger 200 will be discussed in greater detail according to example embodiments. For clarity and ease of illustration, portions of the heat exchanger 200 are hidden from view. Specifically, an upper portion is sectioned away at an angle to reveal interior features. Also, for reference purposes, a Cartesian coordinate system is included with a first axis 201, a second axis 202, and a third axis 203.

Generally, the heat exchanger 200 may include a plurality of first flow structures 204 and a plurality of second flow structures 254. As shown in the illustrated embodiment, the first flow structures 204 and the second flow structures 254 may be generally box-shaped and hollow in some embodiments. The second flow structures 254 may be larger than the first flow structures 204 in some embodiments. In other embodiments, the second flow structures 254 may be smaller than the first flow structures 204. It will be appreciated, however, that the shape, arrangement, geometry, etc. of the first and second flow structures 204, 254 may vary from the illustrated embodiments without departing from the scope of the present disclosure. The relative sizes of the first and second flow structures 204, 254 may be configured according to the operational requirements of the heat exchanger 200. In some embodiments, for example, the first and second flow structures 204, 254 may be shaped, arranged, and configured as a conformal heat exchanger, in that the heat exchangers 200 conforms to the curvature of adjacent components of the engine 100 (e.g., to form an annular ring). Other shapes and sizes are possible to conform to available installation space in other implementations as well.

The first flow structures 204 may be substantially similar to each other. The first flow structures 204 may define respective first flow passages 206 that receive flow of a first fluid (e.g., a first gas). The first flow passages 206 may each include an inlet 208 and an outlet 210, and a first flow axis 212 may extend between the inlet 208 and the outlet 210. In some embodiments, the first flow axis 212 may be generally straight and parallel to the first axis 201.

Also, the second flow structures 254 may be substantially similar to each other. The second flows structures 254 may define respective second flow passages 256 that receive flow of a second fluid (e.g., a second gas). The second flow passages 256 may each include an inlet 260 and an outlet 258, and a second flow axis 262 may extend between the inlet 260 and the outlet 258. In some embodiments, the second flow axis 262 may be generally straight and parallel to the second axis 202. The second flow axis 262 may be substantially orthogonal in a cross flow arrangement to the first flow axis 212 in some embodiments. In additional embodiments, the heat exchanger 200 may have a counter-flow arrangement. Also, the heat exchanger 200 may be conformal in nature where the flow structures 204, 254 are curved to allow for installation in an annular or otherwise curved envelope.

The first and second flow structures 204, 254 may be stacked in an alternating pattern atop each other along the third axis 203. Also, the first flow structures 204 and the second flow structures 254 may be in an alternating arrangement with first flow structures 204 disposed between neighboring pairs of the second flow structures 254 and vice versa. This pattern may be continued until there is a suitable number of first and second flow structures 204, 254. In the illustrated embodiment, for example, the heat exchanger 200 includes a lower first flow structure 205 and an upper first flow structure 207. Also, in the illustrated embodiment, the heat exchanger 200 includes a lower second flow structure 255, an upper second flow structure 257, and an intermediate second flow structure 259. (In FIG. 2, portions of the upper first flow structure 207 and the upper second flow structure 257 are hidden for clarity.) The intermediate second flow structure 259 may be disposed between the opposing lower first flow structure 205 and upper first flow structure 207. The lower first flow structure 205 may be disposed between the opposing lower second flow structure 255 and intermediate second flow structure 259. The upper second flow structure 207 may be disposed between the opposing intermediate second flow structure 259 and upper second flow structure 257. It will be appreciated that there may be additional flow structures within the heat exchanger 200 without departing from the scope of the present disclosure.

In some embodiments, the heat exchanger 200 may include a plurality of separator members 220. The separator members 220 may be relatively flat, unitary panels. Accordingly, the separator members 220 may be substantially parallel to a plane defined by the first axis 201 and the second axis 202. Each separator member 220 may divide one of the first flow passages 206 from an adjacent second flow passage 256. Thus, in some embodiments, the separator member 220 may partly define one of the first flow structures 204 and may partly define an adjacent one of the second flow structures 254.

The first flow structures 204 may also include a respective first side wall 222 and a respective second side wall 224. The first and second side walls 222, 224 may be flat walls that are substantially parallel to a plane defined by the first and third axes 201, 203. The first and second side walls 222, 224 may be spaced apart along the second axis 202 to define a flow width. Accordingly, the first and second side walls 222, 224 and a pair of the separator members 220 may cooperate to define the inlet 208 of one of the first flow passages 206. Likewise, the first and second side walls 222, 224 and the pair of separator members 220 may cooperate to define the outlet 210 of one of the first flow passages 206.

The second flow structures 254 may also include a respective third side wall 226 and a respective fourth side wall 228. The third and fourth side walls 226, 228 may be flat walls that are substantially parallel to a plane defined by the second and third axes 202, 203. The third and fourth side walls 226, 228 may be spaced apart along the first axis 201. Accordingly, the third and fourth side walls 226, 228 and a pair of the separator members 220 may cooperate to define the inlet 260 of one of the second flow passages 256. Likewise, the third and fourth side walls 226, 228 and the pair of separator members 220 may cooperate to define the outlet 258 of one of the second flow passages 256.

Figure 3:
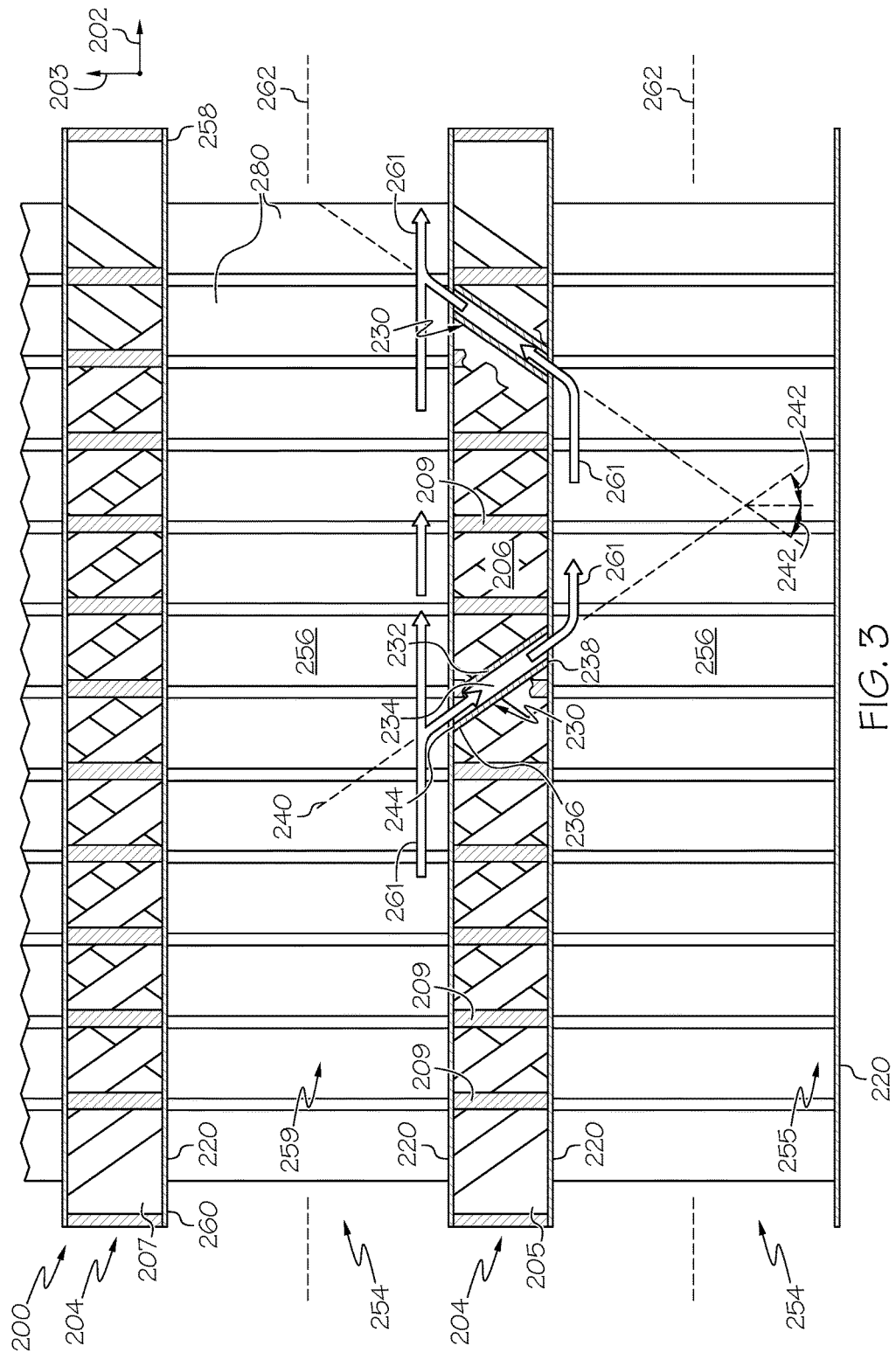
FIG. 3 is a section view of the heat exchanger taken along the line 3-3 of FIG. 2.
Figure 4:
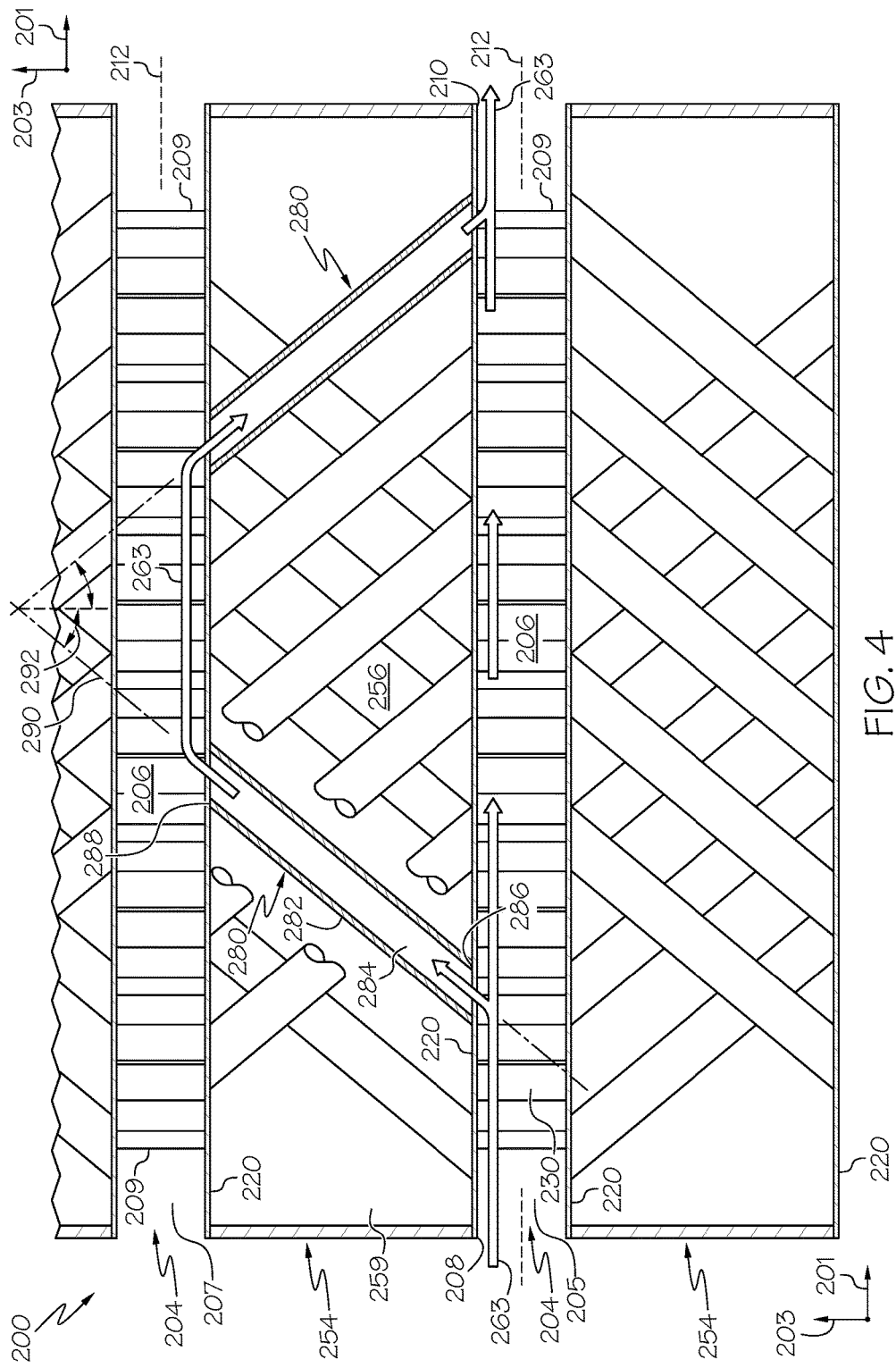
FIG. 4 is a section view of the heat exchanger taken along the line 4-4 of FIG. 2.

Referring now to FIGS. 2, 3, and 4, the interior of the first flow structures 204 and the second flow structures 254 will be discussed. As shown, the heat exchanger 200 may include a plurality of support posts 209. The support posts 209 may be elongate and may extend substantially parallel to the third axis 203. Also, the support posts 209 may have a rounded (e.g., circular) cross section. Moreover, the support posts 209 may have a solid core (as opposed to being hollow). The support posts 209 may be fixed at one end to a separator member 220 and fixed at the opposite end to an opposing separator member 220. In some embodiments, the support posts 209 may be disposed within and may extend across the first flow passages 206, substantially parallel to the third axis 203. The support posts 209 may provide load bearing support to the heat exchanger 200. The arrangement of the support posts 209 may be tailored for providing needed support. For example, as shown in the embodiment of FIG. 2, groups of the support posts 209 may be substantially aligned and arranged in rows (extending along the second axis 202). There may be multiple rows of the support posts 209, and the rows may be spaced apart along the first axis 201. Accordingly, the support posts 209 may provide high strength and robustness to the heat exchanger 200. In some embodiments, the support posts 209 may also provide a heat transfer path between fluids in the first and second flow passages 206, 256.

It will be appreciated that the support posts 209 may be configured differently than the embodiments illustrated. For example, the heat exchanger 200 may include support posts 209 that are disposed within the second flow passage 256. Also, the support posts 209 may, in some embodiments, include fins or other projections that increase the heat transfer properties of the support post 209.

Moreover, the heat exchanger 200 may include a plurality of first hollow members 230. The first hollow members 230 may be configured as tubes, cylinders, pipes, or other fluid conduits. Accordingly, as shown in FIG. 3, the first hollow members 230 may include an outer shell 232 and an interior 234 that is hollow. In some embodiments, the first hollow members 230 may have a rounded (e.g., circular) cross section on its outer diameter surface as well as its inner diameter surface. In some embodiments, the first hollow members 230 may have a diameter between approximately 0.040 to 0.200 inches. Also, in some embodiments, the first hollow members 230 may have a length between approximately 0.050 to 0.300 inches.

Each first hollow member 230 may include a first end 236 and a second end 238 (FIG. 3). The first hollow members 230 may also include a respective first cross-flow axis 240, which extends between the first end 236 and the second end 238. In some embodiments, the first cross-flow axis 240 is substantially straight.

The first end 236 may be fixedly attached to one of the separator members 220, and the second end 238 may be fixedly attached to an opposing one of the separator members 220. The first cross-flow axis 240 of the first hollow member 230 may be oriented at a non-orthogonal angle 242 with respect to the attached separator member 220. In some embodiments, different hollow members 230 may be disposed at different angles 242 with respect to a common separator member 220.

Figure 5:
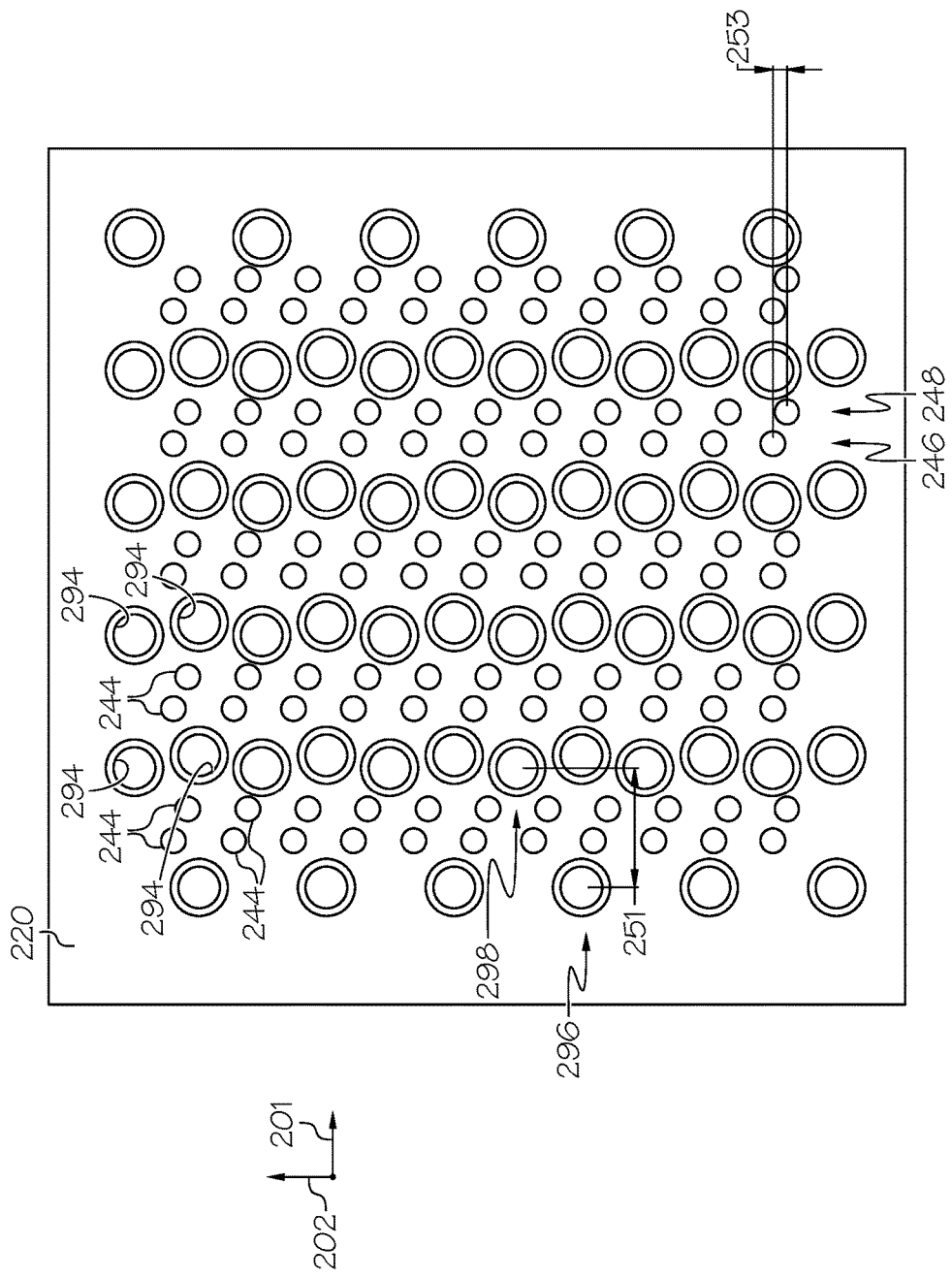
FIG. 5 is a section view of the heat exchanger taken along the line 5-5 of FIG. 2.

In some embodiments, the first hollow members 230 may be disposed within and may extend across the first flow passages 206. Also, as shown in FIG. 3, the first end 236 may be fluidly connected to one of the second flow passages 256, and the second end 238 may be fluidly connected to a neighboring second flow passage 256. As shown in FIG. 5, there may be a plurality of first holes 244 through the separator members 220. The first holes 244 may fluidly connect the interior 234 of a respective first hollow member 230 to the second flow passage 256. Accordingly, fluid within one second flow passage 256 may flow through the first hollow members 230 to the neighboring second flow passage 256. This fluid flow is indicated by arrows 261 in FIG. 3, wherein a second fluid flows from the second flow passage 256 of the intermediate second flow structure 259, through one of the first hollow members 230, to the second flow passage 256 of the lower second flow structure 255. The second fluid is also shown flowing back to the second flow passage 256 of the intermediate second flow structure 259 through another first hollow member 230. Meanwhile, the first fluid may be flowing through the first flow passage 206 and flowing around the first flow hollow members 230. The first and second fluids may have different temperatures, and the first hollow members 230 may be formed with materials having high heat transfer properties. Accordingly, the second fluid may exchange heat with the first fluid as the second fluid passes through the first hollow member 230 that is in direct contact with the first fluid.

The arrangement of the first hollow members 230 may be configured to provide desirable heat transfer properties, to reduce pressure drop across the heat exchanger 200, etc. As stated, the first hollow members 230 may be disposed at an angle 242 with respect to the separator member 220 and with respect to the second flow axis 262. In some embodiments, the first hollow members 230 are inclined within the plane defined by the second axis 202 and the third axis 203. As such, the first hollow members 230 may be inclined generally with respect to the fluid flow path (i.e., with respect to the second flow axis 262). Also, the first end 236 and the second end 238 may be spaced apart with respect to the second axis 202. In other words, the first end 236 of the first hollow member 230 may be closer to the inlet 260 of the second flow passage 256, and the second end 240 may be closer to the outlet 258 of the second flow passage 256, or vice versa.

Accordingly, this inclined orientation may provide a pressure differential between the first end 236 and the second end 238 of the first hollow member 230. The pressure differential may force second fluid through the first hollow members 230. This can enhance the heat transfer performance of the heat exchanger 200. Also, scoop-like features may be implemented at the inlet ends (e.g., the first ends 236) to increase the flow rate.

Furthermore, as shown in the embodiment of FIGS. 2, 3, and 5, groups of the first hollow members 230 may be substantially aligned and arranged in rows (extending along the second axis 202). There may be multiple rows of the first hollow members 230, and the rows may be spaced apart along the first axis 201. In some embodiments, there may be a first row 246 and a second row 248 of first hollow members 230. The first row 246 may be offset from the second row 248 at a distance 253 measured along the second axis 202. The angle 242 of the hollow members 230 within the first row 246 may be different from the angle 242 of the hollow members 230 within the second row 248. In some embodiments, the angle 242 of the hollow members 230 of the first row 246 may be substantially equal and opposite the angle 242 of the hollow members 230 of the second row 248 as shown in FIG. 3. For example, the angle 242 of the hollow members 230 of the first row 246 may be forty-five degrees (45°) in some embodiments, the angle 242 of the hollow members 230 of the second row 248 may be negative forty-five degrees (−45°).

In addition, the heat exchanger 200 may include a plurality of second hollow members 280. The second hollow members 280 may be configured as tubes, cylinders, pipes, or other fluid conduit. Accordingly, as shown in FIG. 4, the second hollow members 280 may include an outer shell 282 and an interior 284 that is hollow. In some embodiments, the second hollow members 280 may have a rounded (e.g., circular) cross section on its outer diameter surface as well as its inner diameter surface. In some embodiments, the second hollow members 280 may have a diameter between approximately 0.040 to 0.200 inches. Also, in some embodiments, the second hollow members 280 may have a length between approximately 0.050 to 0.300 inches.

Each second hollow member 280 may include a first end 286 and a second end 288 (FIG. 4). The second hollow members 280 may also include a respective second cross-flow axis 290, which extends between the first end 286 and the second end 288. In some embodiments, the first cross-flow axis 290 is substantially straight.

The first end 286 may be fixedly attached to one of the separator members 220, and the second end 288 may be fixedly attached to an opposing one of the separator members 220. The second cross-flow axis 290 of the second hollow members 280 may be oriented at non-orthogonal angles 292 with respect to the attached separator member 220. In some embodiments, different hollow members 280 may be disposed at different angles 292 with respect to a common separator member 220.

In some embodiments, the second hollow members 280 may be disposed within and may extend across the second flow passages 256. Also, as shown in FIG. 4, the first end 286 may be fluidly connected to one of the first flow passages 206, and the second end 288 may be fluidly connected to a neighboring first flow passage 206. FIG. 5 shows openings in the separator member 220, and as shown, there may be a plurality of second holes 294 that fluidly connect the interior 284 of the second hollow members 280 to the first flow passage 206. Accordingly, fluid within one first flow passage 206 may flow through the second hollow members 280 to the neighboring first flow passage 206. This fluid flow is indicated by arrows 263 in FIG. 4, wherein a first fluid flows from the first flow passage 206 of the lower first flow structure 205, through one of the second hollow members 280, to the first flow passage 206 of the upper first flow structure 207. The first fluid is also shown flowing back to the first flow passage 206 of the lower first flow structure 205 through another second hollow member 280. Meanwhile, the second fluid may be flowing through the second flow passage 256 and flowing around the second hollow members 280. The first and second fluids may have different temperatures, and the second hollow members 280 may be formed with materials having high heat transfer properties. Accordingly, the first fluid may exchange heat with the second fluid as the first fluid passes through the second hollow member 280.

The arrangement of the second hollow members 280 may be configured to provide desirable heat transfer properties, to reduce pressure drop across the heat exchanger 200, etc. As stated, the second hollow members 280 may be disposed at an angle 292 with respect to the separator member 220 and with respect to the first flow axis 212. In some embodiments, the second hollow members 280 are inclined within the plane defined by the first axis 201 and the third axis 203. As such, the second hollow members 280 may be inclined generally with respect to the fluid flow path (i.e., with respect to the first flow axis 212). Also, the first end 286 and the second end 288 may be spaced apart with respect to the first axis 201. In other words, the first end 286 of the second hollow member 280 may be closer to the inlet 208 of the first flow passage 206, and the second end 288 may be closer to the outlet 210 of the first flow passage 206, or vice versa.

Accordingly, this inclined orientation may provide a pressure differential within the fluid flow between the first end 286 and the second end 288. The pressure differential may force the fluid through the second hollow members 280. This flow through the member enhances the heat transfer performance of the heat exchanger 200. Also, scoop-like features may be implemented at the inlet ends (e.g., the first ends 286) to increase the flow rate.

Furthermore, as shown in the embodiment of FIGS. 2 and 3, groups of the second hollow members 280 may be substantially aligned and arranged in rows (extending along the first axis 201). There may be multiple rows of the second hollow members 280, and the rows may be spaced apart along the second axis 202. In some embodiments represented in FIG. 5, there may be a first row 296 and a second row 298 of first hollow members 230. The first row 296 may be offset from the second row 298 at a distance 251 measured along the first axis 201. The angle 292 (FIG. 4) of the hollow members 230 within the first row 296 may be different from the angle 292 of the hollow members 280 within the second row 298. In some embodiments, the angle 292 of the hollow members 280 of the first row 296 may be substantially equal and opposite the angle 292 of the hollow members 280 of the second row 298 as shown in FIG. 4. For example, the angle 292 of the hollow members 280 of the first row 296 may be forty-five degrees (45°) in some embodiments, and the angle 292 of the hollow members 280 of the second row 298 may be negative forty-five degrees (−45°).

The interior 234 of the first hollow members 230 may have a smaller cross sectional area (e.g., smaller inner diameter) than that of the interior 284 of the second hollow members 280. Furthermore, the length of the first hollow members 230 (measured from the first end 236 to the second end 238 along the axis 240) may be shorter than that of the second hollow member 280. The dimensions of the second hollow members 280 may provide a large amount of exposure within the flow of fluid within the second passages 256 to promote heat transfer between the second fluid within the second passages 256 and the first fluid within the second hollow members 280. These lengths, diameters and angles may be configured according to the performance and other requirements of the heat exchanger 200.

In some embodiments, the first flow passages 206 as well as the second hollow members 280 may receive a hot first fluid, and the second flow passages 256 as well as the first hollow members 230 may receive a cool second fluid. Accordingly, heat may transfer from the first fluid to the second fluid via flow through the heat exchanger 200.

The heat exchanger 200 may be configured to direct flow of the first fluid generally along the flow axis 212 as well as in a cross-flow direction along the axis 290 across the second flow passage 256. Likewise, the heat exchanger 200 may be configured to direct flow of the second fluid generally along the flow axis 262 as well as in a cross-flow direction along the axis 240 across the first flow passage 206. The first hollow members 230 may be inclined or otherwise oriented to direct flow of the second fluid along the axis 262 of the second passageway 256. Likewise, the second hollow members 280 may be inclined or otherwise oriented to direct flow of the first fluid along the axis 212 of the first passageway 206. Accordingly, the fluids may flow in a variety of directions through the heat exchanger 200 to increase efficiency.

Also, the plurality of first hollow members 230 may be inclined within a plane (e.g., the plane defined by the second and third axes 202, 203), and the plurality of second hollow members 280 may be inclined within a plane (e.g., the plane defined by the first and third axes 201, 203. The plane of the first hollow members 230 may be approximately orthogonal to the plane of the second hollow members 280. Other orientations are within the scope of the present disclosure as well.

As shown in FIG. 4, a portion of the first fluid may flow around the criss-crossing, lattice-like arrangement of the first hollow members 230 as the first fluid flows through the first passageway 206. Also, a portion of the first fluid may flow through second hollow members 280 to an adjacent first passageway 206. Thus, the first fluid has an "external flow" about the first hollow members 230 for heat exchange with the second fluid, and the first fluid has an "internal flow" through the second hollow members 280 for heat exchange with the second fluid. Likewise, as shown in FIG. 3, a portion of the second fluid flows around the criss-crossing, lattice-like arrangement of the second hollow members 280 as the second fluid flows through the second passageway 256. Also, a portion of the second fluid may flow through first hollow members 230 to an adjacent second passageway 256. Accordingly, the second fluid has an "external flow" about the second hollow members 280 for heat exchange with the first fluid, and the second fluid has an "internal flow" through the first hollow members 230 for heat exchange with the first fluid.

As shown, the lattice-like arrangement of the first hollow members 230 may be oriented substantially perpendicular to the flow direction through the first passageway 206, and the lattice-like arrangement of the second hollow members 280 may be oriented substantially perpendicular to the flow direction through the second passageway 256. Also, in the illustrated embodiment, the flows are in a cross flow manner with respect to each other; therefore, the lattice-like arrangements may be substantially perpendicular with respect to each other. Accordingly, this provides a high degree of exposure for highly efficient heat transfer between the two fluids.

Flow apportionment throughout the heat exchanger may be accomplished by computational fluid dynamics (CFD) analysis and optimization, for example, utilizing conjugate heat transfer analysis, where the fluid mechanics and structural temperatures are solved in a single coupled analysis. Commercial software codes such as CD-adapco STAR-CCM+ from Siemens AG of Munich, Germany or ANSYS CFX are examples of such codes that may be used by those skilled in the art. To accomplish the optimal flow apportionment and resulting heat transfer, the dimensions and quantities of the first hollow members 230 and the geometric spacing between adjacent second hollow members 280 may be configured to provide suitable flow inside the first hollow members 230 and suitable flow around the second hollow members 280. Similarly, to accomplish the optimal flow apportionment and resulting heat transfer, the dimensions and quantities of the second hollow members 280 and the geometric spacing between adjacent first hollow members 230 may be configured to provide suitable flow inside the second hollow members 280 and suitable flow around the first hollow members 230. Various types of flow scoops may be employed on the first end 236 inlet of one or more first hollow members 230 to facilitate obtaining a predetermined flow 261 through the first hollow members 230. Likewise, various types of flow scoops may be employed on the first end 286 inlet of one or more second hollow members 280 to facilitate obtaining a predetermined flow 263 through the second hollow members 280.

Figure 6:
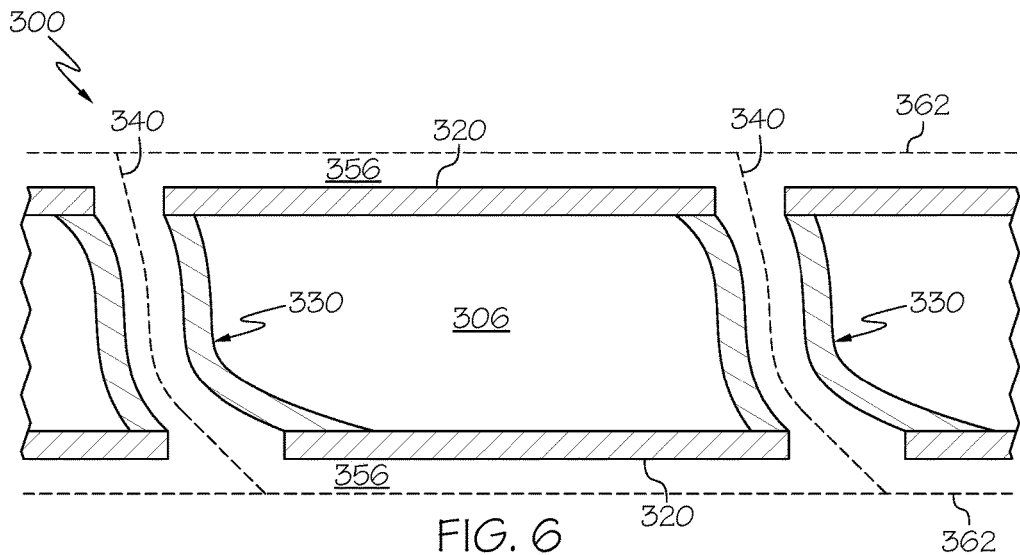
FIG. 6 is a section view of the heat exchanger according to additional embodiments of the present disclosure.

Referring now to FIG. 6, additional embodiments of the heat exchanger 300 are illustrated according to the present disclosure. Only a portion is shown for clarity. The heat exchanger 300 may be substantially similar to the embodiment of FIGS. 2-5 except as noted. Components that correspond to those of FIGS. 2-5 are indicated with corresponding reference numbers increased by 100.

As shown, the first hollow members 330 may have a contoured axis 340. In other words, the first hollow members 330 may curve as they extend across the first flow passage 306. Like the embodiment of FIGS. 2-5 the first hollow members 330 are attached to the separator members 320 at non-orthogonal angles. Also, the first hollow members 330 may be oriented with respect to the flow axes 362 such that the first hollow members 330 direct flow of the second fluid somewhat along the axis 362 of the second passageways 356. Moreover, as shown in FIG. 6, the cross-sectional area of at least one hollow member 330 may vary along its length, for example, to increase the flow through the hollow member 330. It will be appreciated that second hollow members of the heat exchanger 300 may be similar to the first hollow members 330 and may curve and attach to the separator members 320 at non-orthogonal angles as well.

Figure 7:
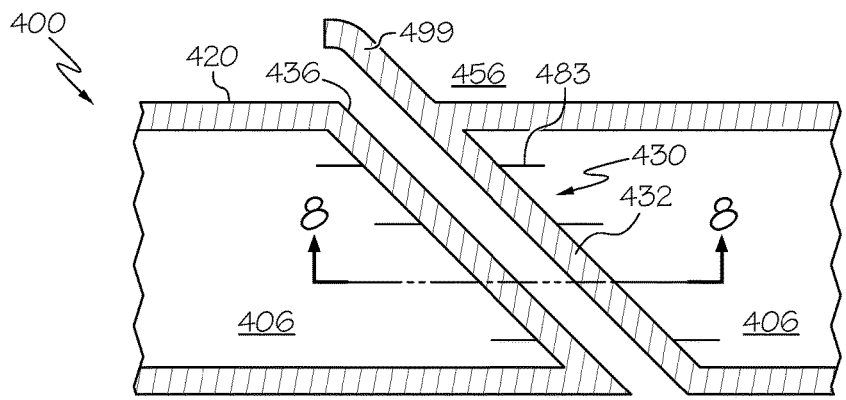
FIG. 7 is a section view of the heat exchanger according to additional embodiments of the present disclosure.
Figure 8:
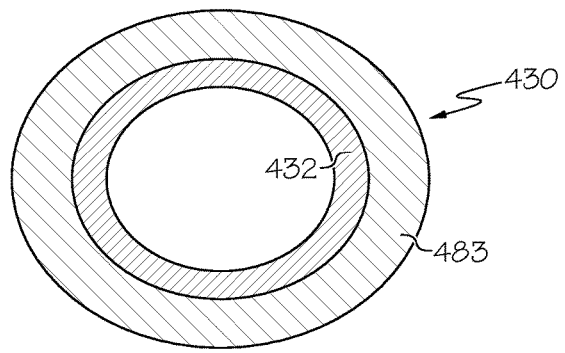
FIG. 8 is a section view of a hollow member of the heat exchanger taken along the line 8-8 of FIG. 7.

Referring now to FIGS. 7 and 8, additional embodiments of the heat exchanger 400 are illustrated according to the present disclosure. Only a portion is shown for clarity. The heat exchanger 400 may be substantially similar to the embodiment of FIGS. 2-5 except as noted. Components that correspond to those of FIGS. 2-5 are indicated with corresponding reference numbers increased by 200.

As shown, the first hollow members 430 may include at least one projection 483 that projects outward from the outer shell 432 into the first flow passage 406. The projection 483 may be a thin, annular disc-like fin that encircles the outer shell 432 in some embodiments. There may be several projections 483 on the first hollow member 430. The projections 483 may promote heat transfer for higher efficiency operation of the heat exchanger 400. Other projections 483 fall within the scope of the present disclosure, such as pins, helical projections, etc. Furthermore, the second hollow members and/or other portions of the heat exchanger 400 may include projections as well.

Furthermore, the heat exchanger 400 may include one or more scoop structures 499. The scoop structure 499 may project from the separator member 420, proximate the first end 436 (i.e., the inlet end) of the first hollow member 430. The scoop structure 499 may also curve in an upstream direction within the second passageway 456. The scoop structure 499 may direct flow of the second fluid into the first hollow member 430.

The heat exchangers of the present disclosure may be manufactured in a variety of ways without departing from the scope of the present disclosure. It will be appreciated that certain features of the presently described heat exchange systems may be prohibitively expensive to manufacture using conventional manufacturing techniques. These features include the inclined or contoured surfaces, the interspersed cross-flow hollow members, the varying wall thickness features, among others. As such, designs in accordance with the present disclosure are not known in the prior art.

However, in some embodiments, the heat exchanger of the present disclosure may be formed using additive manufacturing techniques (e.g., 3D printing techniques). Thus, the heat exchanger may be formed more accurately and at a significantly reduced cost as compared to traditional manufacturing techniques. The heat exchanger may be a substantially unitary, one-piece component using these techniques. In other words, the flow structures, the hollow members, projections, and other features of the heat exchanger may be integrally connected so as to be a unitary, one-piece heat exchanger.

Additive manufacturing techniques include, for example, direct metal laser sintering (DMLS—a form of direct metal laser fusion (DMLF)) or electron beam additive manufacturing. The heat exchanger may be manufactured from aluminum, titanium, steel, and nickel-based alloys. Still further, casting or metal injection molding (MIM) may be employed. In some embodiments, the heat exchanger of the present disclosure may be constructed using techniques disclosed in US Patent No. 2013/0236299, the disclosure of which is hereby incorporated by reference in its entirety.

Accordingly, the heat exchanger of the present disclosure provides highly efficient heat exchange. Also, the heat exchanger may be lightweight, and yet, robust and strong for a long operating life. Additionally, the heat exchanger may provide manufacturing benefits as well.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It is understood that various changes may be made in the function and arrangement of elements described in an exemplary embodiment without departing from the scope of the present disclosure as set forth in the appended claims.

What is claimed is:

1. A heat exchanger comprising:
a separator member that divides a first flow passage of the heat exchanger from a second flow passage of the heat exchanger;
a plurality of first hollow members that extend across the first flow passage and that are attached to the separator member at respective non-orthogonal angles, the plurality of first hollow members being fluidly connected to the second flow passage; and
a plurality of second hollow members that extend across the second flow passage and that are attached to the separator member at respective non-orthogonal angles, the plurality of second hollow members being fluidly connected to the first flow passage;
wherein the first flow passage is configured to receive a first fluid that flows through the first flow passage and into the plurality of second hollow members;
wherein the second flow passage is configured to receive a second fluid that flows through the second flow passage and into the plurality of first hollow members;
wherein the first fluid is configured to exchange heat with the second fluid as the first fluid flows through the first flow passage and over the plurality of first hollow members; and
wherein the second fluid is configured to exchange heat with the first fluid as the second fluid flows through the second flow passage and over the plurality of second hollow members.

2. The heat exchanger of claim 1, wherein the first hollow members are attached to the separator member and arranged in a first row of hollow members and a second row of hollow members;
wherein the hollow members of the first row are attached to the separator member at a first acute angle; and
wherein the hollow members of the second row are attached to the separator member at a second acute angle that is different from the first acute angle.

3. The heat exchanger of claim 2, wherein the first and second acute angles are substantially opposite each other.

4. The heat exchanger of claim 1, wherein the first flow passage has an inlet and an outlet and a flow axis extending between the inlet and the outlet;
wherein at least one of the first hollow members has a first end and a second end and a cross-flow axis extending between the first end and the second end; and
wherein the cross-flow axis is oriented with respect to the flow axis to direct flow through the at least one hollow member along the flow axis.

5. The heat exchanger of claim 4, wherein the cross-flow axis is substantially straight.

6. The heat exchanger of claim 4, wherein the cross-flow axis is curved.

7. The heat exchanger of claim 1, wherein the first hollow members have respective first cross-flow axes that are disposed within a first plane;
wherein the second hollow members have respective second cross-flow axes that are disposed within a second plane;
wherein the first plane intersects the second plane.

8. The heat exchanger of claim 7, wherein the first plane is substantially orthogonal to the second plane.

9. The heat exchanger of claim 1, wherein the first hollow members have a respective first length;
wherein the second hollow members have a respective second length; and
wherein the second length is greater than the first length.

10. The heat exchanger of claim 1, wherein the first hollow members have a respective first cross sectional area; and
wherein the second hollow members have a respective second cross sectional area; and
wherein the second cross sectional area is greater than the first cross sectional area.

11. The heat exchanger of claim 1, wherein at least one of the first hollow members includes a projection, the projection chosen from a group consisting of a fin, a pin, and a helical projection.

12. A method of manufacturing a heat exchanger comprising:
forming a first flow structure with a first flow passage and a second flow structure with a second flow passage, including forming a separator member that divides the first flow passage from the second flow passage;

forming a plurality of first hollow members that extend across the first flow passage and that are attached to the separator member at respective non-orthogonal angles, the plurality of first hollow members being fluidly connected to the second flow passage; and forming a plurality of second hollow members that extend across the second flow passage and that are attached to the separator member at respective non-orthogonal angles, the plurality of second hollow members being fluidly connected to the first flow passage;

the first flow passage being configured to receive a first fluid that flows through the first flow passage and into the plurality of second hollow members;

the second flow passage being configured to receive a second fluid that flows through the second flow passage and into the plurality of first hollow members;

the first fluid being configured to exchange heat with the second fluid as the first fluid flows through the first flow passage and over the plurality of first hollow members; and the second fluid being configured to exchange heat with the first fluid as the second fluid flows through the second flow passage and over the plurality of second hollow members.

13. The method of claim 12, further comprising additively manufacturing the first flow structure, the second flow structure, the plurality of first hollow members, and the second hollow members to be unitary.

* * * * *